(12) United States Patent
Schlueter et al.

(10) Patent No.: US 9,045,881 B1
(45) Date of Patent: Jun. 2, 2015

(54) DEPLOYABLE SAFETY APPARATUS

(71) Applicant: Yankee Ridge Solutions, LLC, Urbana, IL (US)

(72) Inventors: Jeff Schlueter, Rantoul, IL (US); Hugh Gallivan, Champaign, IL (US)

(73) Assignee: Yankee Ridge Solutions, LLC, Urbana, IL (US)

( * ) Notice: Subject to any disclaimer, the term of this patent is extended or adjusted under 35 U.S.C. 154(b) by 0 days.

(21) Appl. No.: 14/277,133

(22) Filed: May 14, 2014

(51) Int. Cl.
*B60R 19/54* (2006.01)
*E02F 9/24* (2006.01)

(52) U.S. Cl.
CPC ........................................ *E02F 9/24* (2013.01)

(58) Field of Classification Search
USPC ................. 280/770, 765.1, 762, 768
See application file for complete search history.

(56) References Cited

U.S. PATENT DOCUMENTS

| | | | | |
|---|---|---|---|---|
| 1,456,589 A | * | 5/1923 | Ebner | 369/243 |
| 3,443,658 A | * | 5/1969 | Culp | 180/279 |
| 3,560,922 A | * | 2/1971 | Rodgers | 340/436 |
| 3,782,766 A | * | 1/1974 | Teel | 280/770 |
| 3,812,978 A | | 5/1974 | Roland | |
| 4,434,901 A | | 3/1984 | Gehl | |
| 4,524,953 A | * | 6/1985 | Phillips et al. | 256/23 |
| 6,102,373 A | | 8/2000 | Amsinger | |
| 6,516,917 B1 | * | 2/2003 | Mayer et al. | 280/765.1 |

* cited by examiner

*Primary Examiner* — Hau Phan
(74) *Attorney, Agent, or Firm* — McDonnell Boehnen; Hulbert & Berghoff LLP

(57) ABSTRACT

A deployable safety apparatus attached to a vehicle frame includes two or more support components that are coupled to the vehicle frame, extend outwardly from the vehicle frame when the safety apparatus is deployed, and retract inwardly toward the vehicle frame when the safety apparatus is not deployed, or retracted. Barrier components coupled to one or more corresponding support components form a safety barrier surrounding at least a portion of the vehicle when the safety apparatus is deployed and remain in a retracted position near the side of the vehicle when the safety apparatus is in a retracted position (i.e., not deployed). In some embodiments, at least some barrier components are additionally configured to form a fall-prevention barrier extending upward from the vehicle when the safety apparatus is in the retracted position.

18 Claims, 7 Drawing Sheets

DEPLOYABLE SAFETY APPARATUS

BACKGROUND

Unless otherwise indicated herein, the materials described in this section are not prior art to the claims in this application and are not admitted to be prior art by inclusion in this section.

Safety is a major concern for operators of construction equipment. For example, since 1992, the Bureau of Labor Statistics has tracked fatal workplace accidents in its Census of Fatal Occupational Injuries (CFOI). As the CFOI details, the number of worker fatalities has ranged between 4,551 per year and 6,632 per year from 1992 to 2012. A significant percentage of these deaths occur as a result of accidents involving construction equipment.

One reason for accidents is that workers on the ground, or innocent bystanders, are struck by construction equipment or caught between and pinched or crushed by pieces of construction equipment. This can occur when a construction vehicle operator's vision is reduced by a blind area. A blind area, or blind spot, is the area around a vehicle or piece of construction equipment that is not visible to the operator by direct line-of-sight, via a camera, or indirectly by use of mirrors. These dangers are further exacerbated by frequent relocation of construction equipment on, off, and/or around a worksite as a project progresses because the frequent movement may cause areas of the worksite that fall within the operator's blind spots to change as the location of the equipment on the worksite changes from hour-to-hour or day-to-day, as the case may be. A list of various construction vehicles with information relating to their respective blind spots is maintained by the National Institute for Occupational Safety and Health, currently found at: www.cdc.gov/niosh/topics/highwayworkzones/BAD/imagelookup.html.

Federal regulations recognize and attempt to address the problem of construction equipment blind spots. For example, the Code of Federal Regulations, at Title 29 C.F.R. Section 1926.1424, addresses swing work area controls where the equipment's rotating superstructure (whether permanently or temporarily mounted) poses a reasonably foreseeable risk of (i) striking and injuring an employee or (ii) pinching/crushing an employee against another part of the equipment or another object. In either of these cases, federal regulations require employers to train each employee assigned to work on or near the equipment how to recognize struck-by and pinch/crush hazard areas posed by the rotating superstructure. Employers must also erect and maintain control lines, warning lines, railings or similar barriers to mark the boundaries of the hazard areas. However, despite these regulations, 16% of occupational fatalities in 2012 (or approximately 740 deaths—over 2 deaths each work day) were a result of the victim's contact with objects and equipment according to CFOI. Thus, despite the safety measures required by the regulations and the ready availability of railings or similar barriers for use in blocking off safe zones around equipment, the threat of death or serious bodily injury from construction machinery remains high. Accordingly, there exists a clear need for safety systems that are effective in reducing the risk of death and serious bodily harm, fast and easy to implement, and convenient to stow away when the construction machinery is not in use.

SUMMARY

Because of the importance of workplace safety, others have attempted to mitigate the dangers associated with operating construction equipment at worksites.

For example, U.S. Pat. No. 3,812,978 describes a manually deployable crane safety barrier with a flexible tension member designed to make workers aware of a dangerous condition. However, the flexible tension member described in the '978 patent does not provide a barrier that is effective in preventing (or at least substantially deterring) workers from entering a dangerous area surrounding the crane, and indeed, the '978 patent states that it is virtually impossible to provide a portable barrier in order to prevent a person approaching the crane if he is determined to do so. Additionally, the complexity involved in deploying the crane safety barrier of the '978 patent (including moving the float pads into position, configuring the supports, and threading the separate flexible tension wire through the anchor rings of the supports) is cumbersome and time consuming, and it introduces a risk that workers may deploy the barrier incorrectly, thereby reducing the limited safety advantages the system may have otherwise provided. In some instances, the complexity required to deploy the safety barrier may reduce the likelihood that workers will take the time and effort to actually deploy the safety barrier, particularly on projects with tight schedules and budgets. Additionally, tear-down of the '978 patent's barrier after use is equally time-consuming and complicated, and there is no identified location or means for storing the components, which could result in workers losing or misplacing components that would be required the next time the barrier might need to be deployed.

Similarly, U.S. Pat. No. 4,434,901 also describes a crane safety system that employs a cable surrounding the crane. The cable is connected to an alarm system that alerts the crane operator (via an audible alarm) when a person or object has laterally deflected the cable, for example, by walking into, tripping over, leaning on, etc. the cable, or (because the cable surrounding the crane moves with the crane body while the crane rotates) when the crane rotates and causes the cable to hit a worker or another object in the area. The cable also includes visual warnings along the periphery (e.g., signs, flags, and the like) to alert workers of possible danger. However, like the flexible tension member described in the '978 patent, the cable of the '901 patent does not provide a barrier that is effective to prevent (or at least substantially hinder) workers from entering a dangerous area surrounding the crane. Indeed, rather than preventing workers from entering a dangerous area, the safety system of the '901 patent is intended to notify the crane operator when the cable is deflected so that the operator can stop the operation of the crane to determine the cause of the alarm.

Additionally, once installed, the safety system of the '901 patent protrudes around the entire cab of the crane, thereby making some cranes more difficult (or perhaps impossible) to transport from site to site without detaching the safety system from the crane because of the clearance required on both sides of the crane to accommodate the safety system. This additional transportation difficulty may discourage workers from actually installing the safety system of the '901 patent on cranes in the first instance, particularly larger cranes that may require detachment and disassembly of the safety system prior to transportation.

U.S. Pat. No. 6,102,373 describes another warning system that attempts to address the problem of dangerous worksite conditions. The warning system of the '373 uses a warning tape held in place by multi-positional arms that are magnetically affixed to the cab of the crane. Because the multi-positional arms are affixed to the crane, the warning system of the '373 patent moves with the cab of the crane as the crane cab rotates about the base the crane. However, like the systems described in the '978 and '901 patents, the warning system of the '373 patent also does not provide a barrier effective to prevent (or at least substantially inhibit) workers from entering a dangerous area surrounding the crane. And although the magnetic attachments enable the multi-positional arms of '373 patent's warning system to be easily detached from the cab or repositioned to facilitate transportation of the crane, this degree of flexibility also presents a risk that workers might install, deploy, or operate the warning system incorrectly, thereby reducing the limited safety advantages the system may have otherwise provided.

To overcome the shortcomings of earlier safety and warning systems, and to provide safer working conditions in and around construction worksites, the construction safety mechanisms described herein include, among other aspects, deployable (and retractable) barriers that are effective to prevent (or at least substantially hinder, inhibit, or discourage) workers and/or other individuals from entering a dangerous area surrounding the construction vehicle. The structure and positioning of the safety barriers when deployed prevent individuals from accidentally walking, tripping, or falling into a dangerous blind spot surrounding the construction equipment (e.g., a crane, excavator, or similar construction machinery with one or more operator blind spots, including but not limited to machinery with rotating cabs), or at least substantially reduce the likelihood that a worker will walk, trip, or fall into a dangerous area. Similarly, the ease with which the safety barriers are deployed eliminates (or at least substantially reduces) the likelihood that workers will deploy the barriers incorrectly or in a manner that otherwise limits or reduces the effectiveness of the barriers. Also, when retracted, the safety barriers are held very close to the construction machinery/vehicle to facilitate ease of transportation around a worksite and/or between worksites. And once the machinery is in position for its next task, the safety barriers can be quickly and easily deployed to block off a safe operating perimeter around the construction machinery. In some embodiments, one or more barrier components are additionally configured to form a fall-prevention barrier extending upward from the vehicle frame when the safety apparatus is in the retracted position.

Some embodiments of the disclosed construction safety mechanisms include a safety apparatus configured to attach to a vehicle frame, such as the frame of a crane, excavator, or other similar construction vehicle/machine having one or more operator blind spots, including but not limited to machinery having rotating cabs. The safety apparatus includes a plurality of support components and a plurality of barrier components. At least some of the individual support components are configured to (i) extend outwardly from the vehicle frame when the safety apparatus is deployed and (ii) retract inwardly toward the vehicle frame when the safety apparatus is not deployed (e.g., to facilitate easy transportation). And at least some of the barrier components are coupled to one or more corresponding support components of the plurality of support components and configured to (i) form a safety barrier surrounding at least a portion of the vehicle when the safety apparatus is deployed and (ii) remain in a retracted position when the safety apparatus is not deployed. In operation, the safety apparatus is held nearer to the vehicle frame in the refracted position, compared to when the safety apparatus is in the deployed position. In preferred embodiments, the barrier components are held substantially flat against the vehicle frame when the safety apparatus is in the retracted (i.e., not deployed) position.

Other embodiments of the disclosed construction safety mechanisms include a crane, excavator, or other construction vehicle equipped with an integrated deployable/retractable safety barrier system that is attached to the construction vehicle frame. The integrated system includes a plurality of support components extending from the vehicle frame. Individual support components are configured to (i) extend outwardly from the vehicle frame when the safety apparatus is deployed and (ii) retract inwardly toward the vehicle frame when the safety apparatus is not deployed. Individual barrier components are coupled to one or more corresponding support components of the plurality of support components and are configured to (i) form a safety barrier surround at least a portion of the vehicle when integrated system is deployed and (ii) remain in a retracted position when the integrated system is not deployed. In operation, the barrier components are held nearer to the vehicle frame when the system is retracted, compared to when the system is in the deployed position. In preferred embodiments, the barrier components are held substantially flat against the vehicle frame when the safety apparatus is in the retracted (i.e., not deployed) position.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
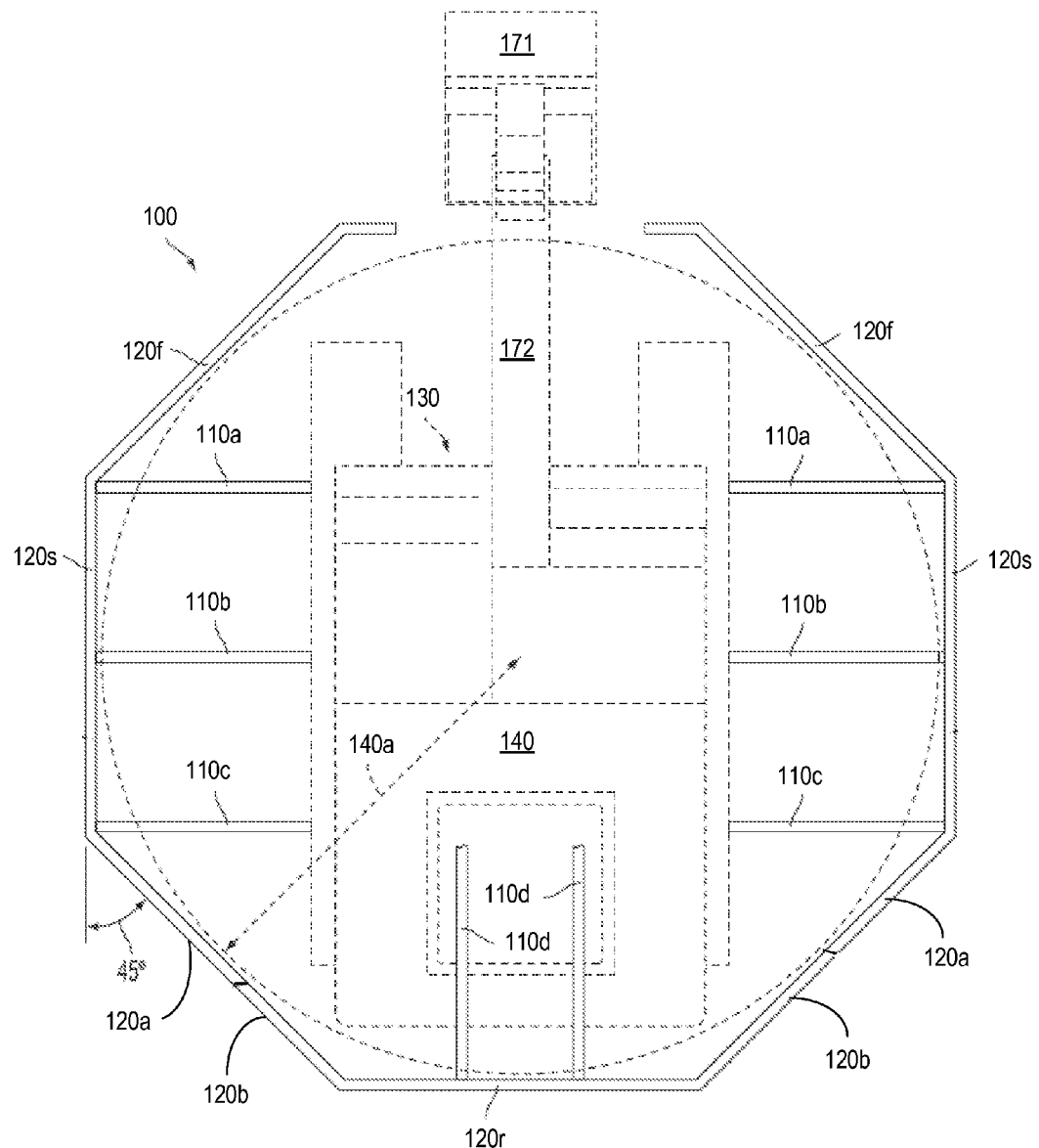
FIG. 1 shows a high-level top view of an example safety apparatus in a deployed position, according to some embodiments of the invention.
Figure 2:
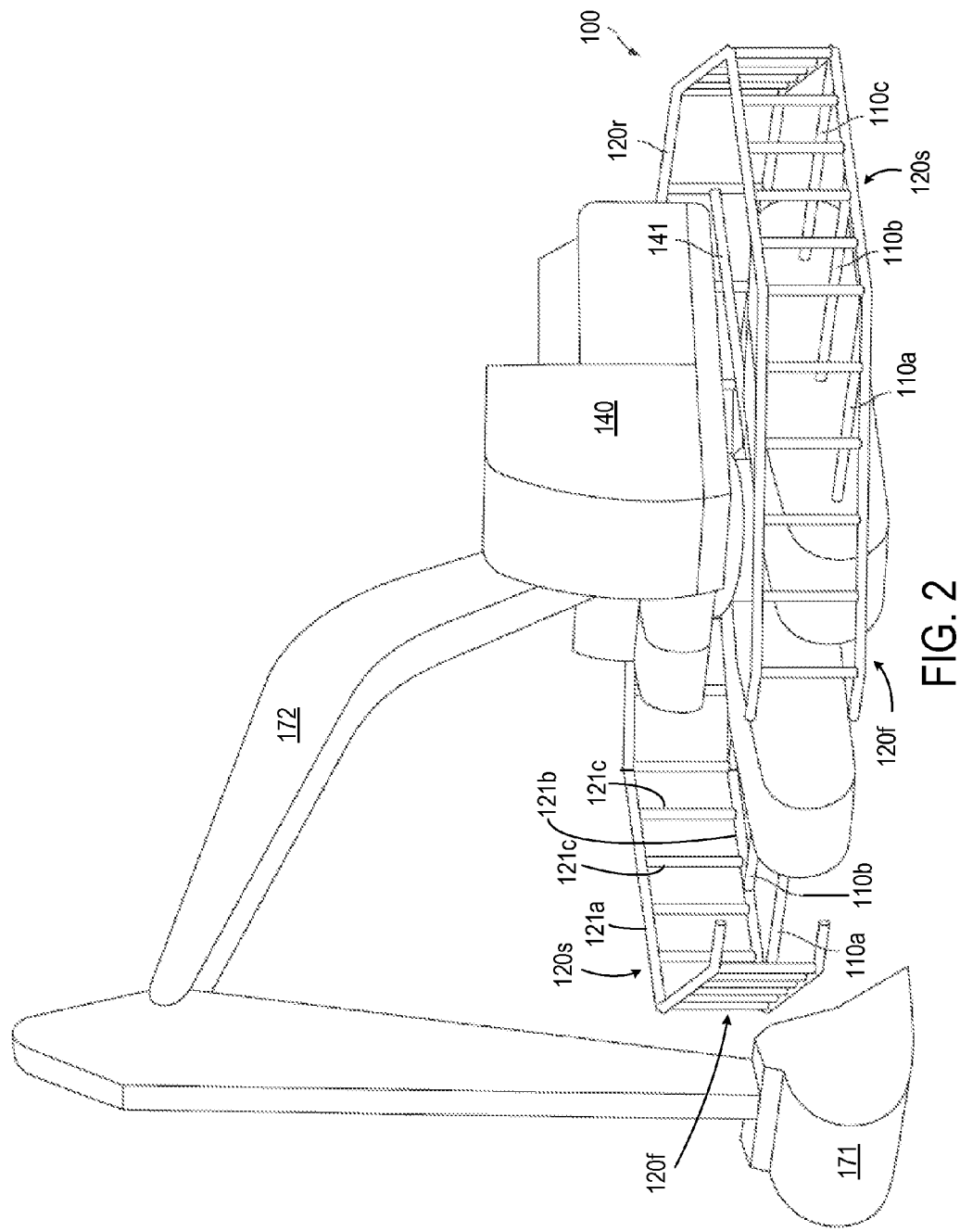
FIG. 2 shows a perspective view of the example safety apparatus of FIG. 1 in the deployed position.
Figure 3:
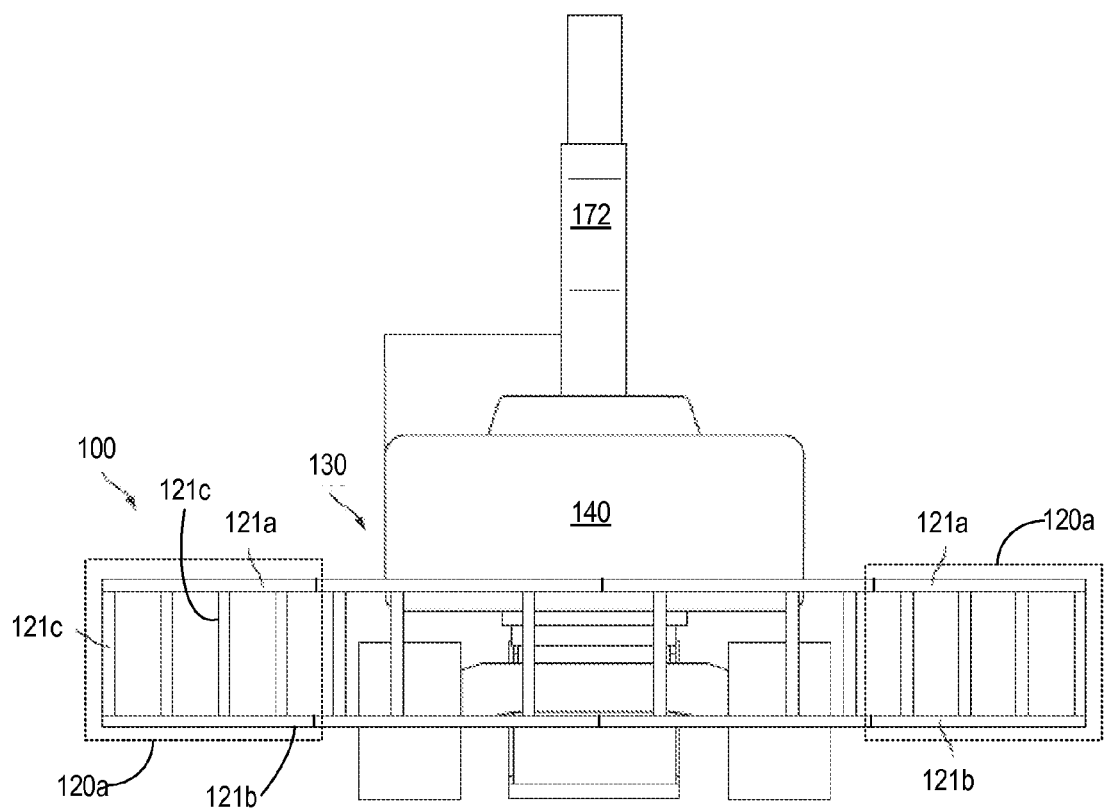
FIG. 3 shows a rear view of the example safety apparatus of FIG. 1 in the deployed position.

FIG. 1 shows a high-level top view of an example safety apparatus 100 in a deployed position, FIG. 2 shows a perspective view of the example safety apparatus 100 of FIG. 1 in the deployed position, and FIG. 3 shows a rear view of the example safety apparatus of FIG. 1 in the deployed position, according to some embodiments.

In FIGS. 1, 2, and 3, the safety apparatus 100 includes a plurality of support components 110*a-d* and a plurality of barrier components 120*a*, 120*b*, 120*r*, 120*s*, and 120*f*. Each of the plurality of support components 110*a-d* is coupled to the vehicle frame, for example, the cross-frame of a construction vehicle 130. Likewise, each of the plurality of barrier components is coupled to one or more corresponding support components 110a-d. The construction vehicle 130 includes a rotatable cab 140 having a swing radius 140a. In the example shown in FIGS. 1, 2, and 3, the vehicle 130 is an excavator with a "bucket" or "scoop" 171 at the end of an arm 172 extending from the rotatable cab 140. However, the safety apparatus 100 could be used with other similar machines with or without rotating cabs. In operation, the rotatable cab 140 rotates on top of the construction vehicle 130 as the operator uses the "bucket" or "scoop" 171 to move materials (e.g., dirt, rocks, debris, or other materials) around a worksite, and in preferred embodiments, the safety apparatus 100 forms a safety barrier that extends beyond the swing radius 140a of the rotating cab 140 as described herein.

The safety apparatus 100 includes individual support components 110a-d. Each support component is configured to extend outwardly from the vehicle 130 as shown in FIGS. 1 and 2 when the safety apparatus 100 is deployed. As shown, the left and right sides of the safety apparatus have identical (or at least substantially similar) components, and are labeled accordingly. However, in some embodiments, the left and right sides may not be identical (or even substantially similar) depending on the type and configuration of the construction vehicle.

Each support component is connected to one or more barrier components 120a, 120b, 120r, 120s, and 120f. When extended, barrier component 120f is positioned along the front left and front right sides of the vehicle 130 by support component 110a, barrier component 120s is positioned along the side of the vehicle 130 by support components 110a-c, barrier components 120a and 120b are positioned along the rear side of the vehicle 130 by support components 110c-d, and barrier component 120r is positioned along the rear of the vehicle 130 by support component 110d.

The barrier components 120a, 120b, 120r, 120s, and 120f are configured to form a safety barrier surrounding at least a portion of the vehicle 130 when the safety apparatus 100 is deployed, as described herein. Some embodiments may have more, fewer, or differently-configured barrier components than the ones shown and described herein. For example, some embodiments may not include the rear barrier component 120r (or a similar barrier component along the rear the vehicle) or the front barrier component 120f (or a similar barrier component along the front of the vehicle). Similarly, in some embodiments, the side component 120s may not necessarily be flat or substantially flat and the front barrier component 120f may have a shape that is different than the L-shape configuration shown. The configuration, number, and arrangement of barrier components may vary according to the type and design of the construction vehicle with which the safety apparatus 100 is used.

In some embodiments, one or more of the barrier components 120a, 120b, 120r, 120s, and 120f (or perhaps even all of the barrier components in some embodiments) are configured to additionally form a fall-prevention barrier extending upward from the vehicle frame and surrounding at least a portion of the body of the vehicle 130 when the safety apparatus 100 is retracted (or at least partially retracted) toward the vehicle 130.

For example, one or more (or perhaps all) of the barrier components may be sufficiently tall so as to create the fall-prevention barrier in the form of a wall-like structure extending upward from the frame of the vehicle 130 and surrounding at least a portion of the vehicle 130 where a person may need to access the engine (or other components) for repair and/or maintenance. When the safety apparatus 100 is retracted (or at least partially retracted) against the vehicle 130, the fall-prevention barrier (formed from the one more barrier components) is arranged to prevent a person from falling off of the vehicle 130 and injuring himself, or at least substantially reduce the likelihood that a person will fall off the vehicle and injure himself. Thus, in operation, the deployable safety apparatus 100 provides a secondary safety benefit by additionally reducing the likelihood of falls from the vehicle 130 when the safety apparatus 100 is retracted, or at least partially retracted, against the vehicle 130.

In some embodiments, the one or more particular barrier components that form the fall-prevention barrier may be larger (e.g., taller) than other barrier components so that, when retracted against the vehicle 130, the particular barrier component or components forming the fall-prevention barrier extend upward from the frame of the vehicle 130. In other embodiments, the one or more barrier components that form the fall-prevention barrier may be expandable or extendable so as to form the wall-like structure of the fall-prevention barrier. For example, in such embodiments, each of the barrier components that form the fall-prevention barrier may have one or more extension pieces that slide out, fold out, or swing out from the barrier component (or perhaps attach to the barrier component) to form at least part of the wall-like structure of the fall-prevention barrier, thereby enabling the fall-prevention barrier to be erected when required (e.g., when a person needs to perform a repair or maintenance activity) and dismantled when no longer needed (e.g., once the repair and/or maintenance activity is concluded). Each extension piece may have the same form or a similar form as the barrier component that it slides, folds, or swings out from (or that it attaches to and detaches from, depending on the embodiment). For example, an extension piece for a barrier component having a gate-like structure may have a similar gate-like structure. Likewise, an extension piece for a barrier component having a mesh-like or grate-like structure may have a similar mesh-like or grate-like structure. However, in other embodiments, one or more extension pieces may have a form that is different than the barrier component that it slides, folds, or swings out from (or that it attaches to and detaches from, depending on the embodiment).

Nevertheless, regardless of implementation, the additional fall-prevention barrier is arranged so as to not impact, affect, or otherwise reduce the efficacy of the deployable safety apparatus's primary function, i.e., preventing (or at least substantially hindering, inhibiting, or otherwise discouraging) workers and/or other individuals from entering the area protected by the safety barrier surrounding at least a portion of the vehicle 130 when the safety apparatus 100 is deployed.

In embodiments according to the example shown in FIGS. 1, 2, and 3, and as illustrated in FIGS. 2 and 3, the individual barrier components 120a, 120b, 120r, 120s, 120f include a gate-like structure comprising an upper horizontal member 121a, a lower horizontal member 121b, and a plurality of connecting members 121c coupled to the upper and lower horizontal members 121a, 121b. In other embodiments, individual barrier components may have a mesh structure or a grate structure between the horizontal members 121a, 121b instead of or in addition to the plurality of connecting members 121c. In still further embodiments, the individual barrier components may have a solid structure (e.g., a flat metal or hard plastic plate) between the upper and lower horizontal members 121a, 121b instead of or in addition to the plurality of the connecting members 121c. Regardless of the configuration (gate-like, mesh, grate, solid, or otherwise), the safety barrier formed by the barrier components is effective to prevent (or at least substantially hinder, inhibit, or otherwise discourage) workers and/or other individuals from entering the area protected by the safety barrier.

The safety apparatus 100 is considered to be in the deployed position when the support components 110a-d are extended substantially outward from the vehicle frame and supporting the barrier components 120a, 120b, 120r, 120s, 120f in a configuration that forms a safety barrier surrounding at least a portion of the vehicle 130. In preferred embodiments, the safety barrier formed by the barrier components of the safety apparatus in the deployed position is designed to extend further than the circumference defined by the swing radius 140a of the rotatable cab 140 of the vehicle 130. However, the safety barrier need not totally surround the vehicle. In some embodiments, the safety barrier formed by the barrier components may surround a major arc of a circumference defined by the swing radius 140a, as illustrated in FIG. 1. A major arc, as used herein, has the plain and ordinary meaning, namely an arc of a circle having measure greater than or equal to 180 degrees.

The safety apparatus 100 may also be retracted inwardly toward the vehicle frame to facilitate movement of the vehicle 130 from location to location on a worksite, or to transport the vehicle elsewhere (e.g., to a different worksite or to an equipment storage area). When the safety apparatus 100 is in the retracted position, the support components 110a-d and the barrier components 120a, 120b, 120r, 120s, 120f are pulled inward toward the vehicle frame, and held closer to the vehicle frame than when the safety apparatus 110 is in the deployed position. In preferred embodiments, the barrier components are held substantially flat against the vehicle frame when the safety apparatus 100 is in the retracted (i.e., non-deployed) position.

Putting the safety apparatus 100 into the retracted position is useful for moving the construction vehicle 130 with the safety apparatus 100 still attached but not deployed. For example, the construction vehicle may need to travel through narrow paths such as a narrow tunnel, or between two existing structures, or along a narrow trail or forest path. Additionally, retracting the safety apparatus 100 is helpful when the construction vehicle is transported via a trailer along roads or highways, particularly where the construction vehicle with the safety apparatus in the deployed position would be wider than the lanes on the road or highway.

Figure 4A:
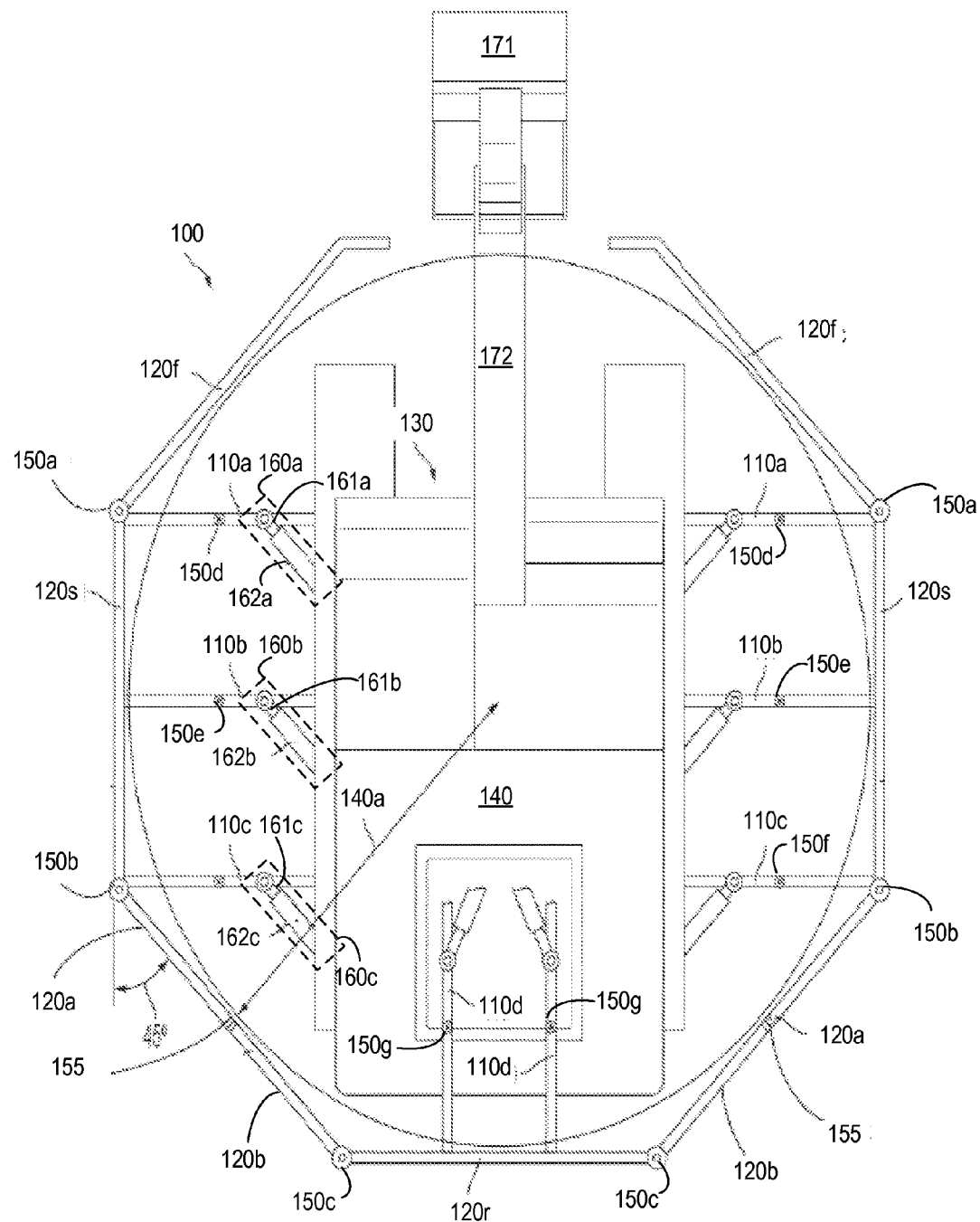
FIG. 4A shows an example safety apparatus in the fully deployed position, according to some embodiments.
Figure 4B:
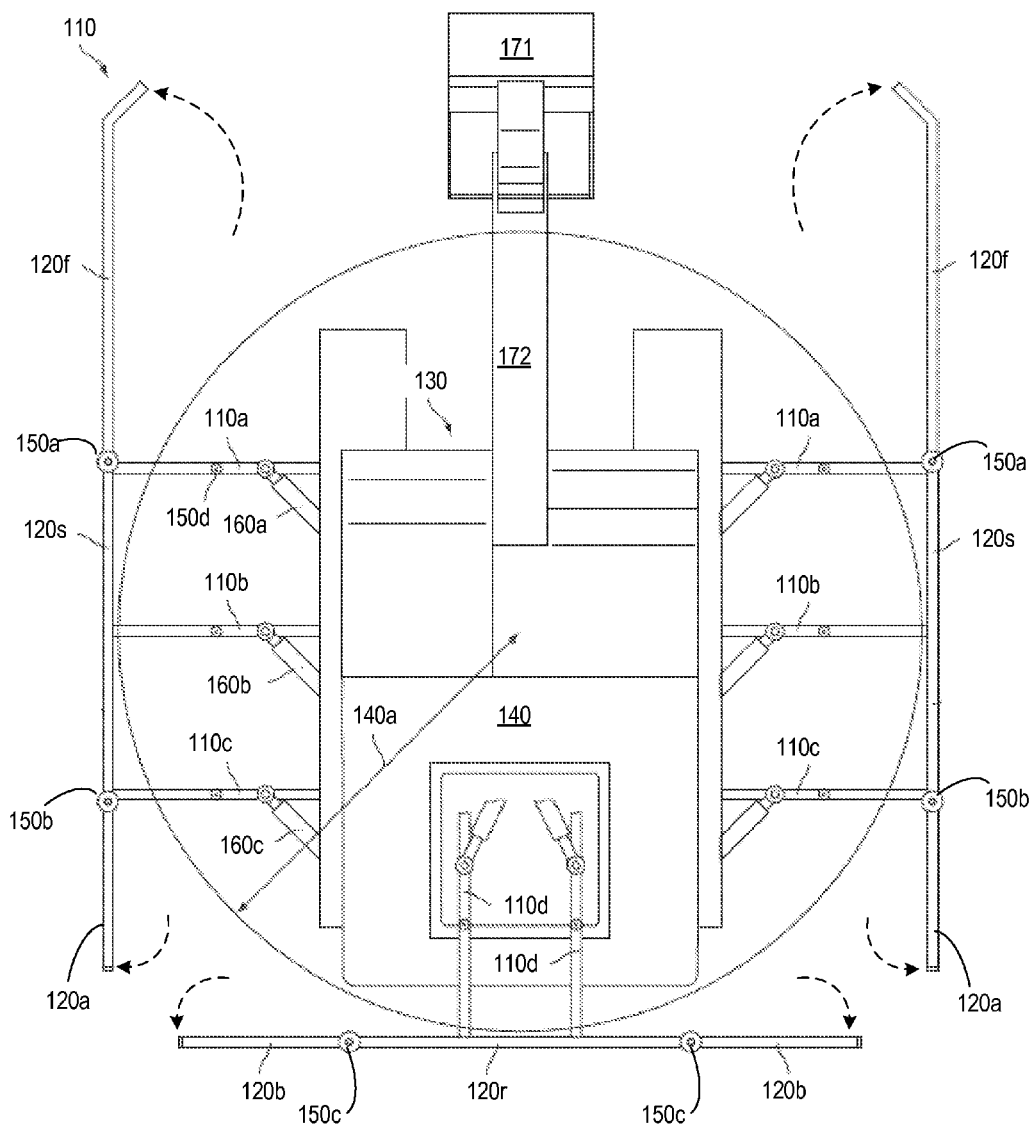
FIG. 4B shows the example safety apparatus of FIG. 4A in a preparatory stage of retraction.
Figure 4C:
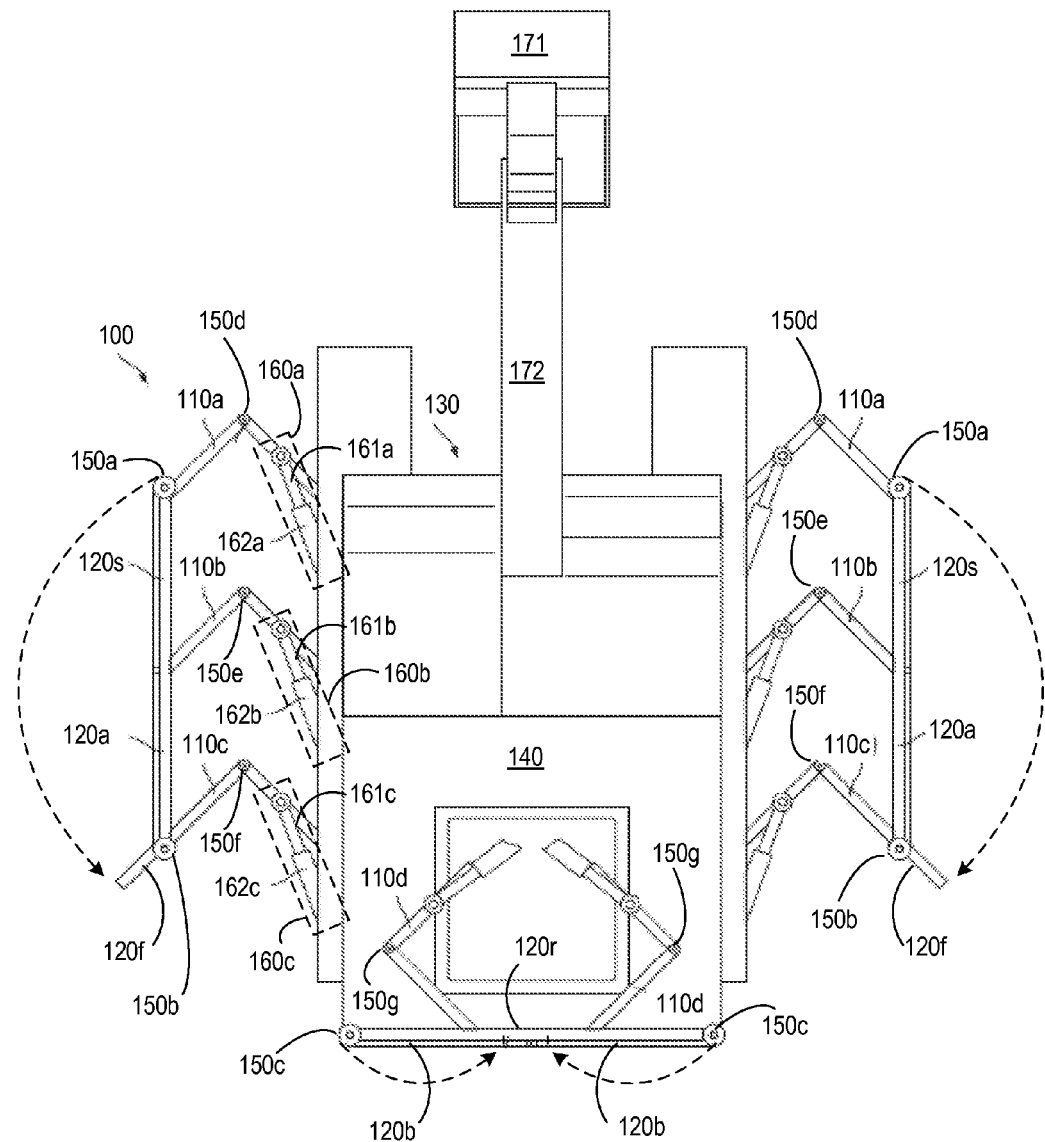
FIG. 4C shows the example safety apparatus of FIGS. 4A and 4B in a further stage of retraction.
Figure 4D:
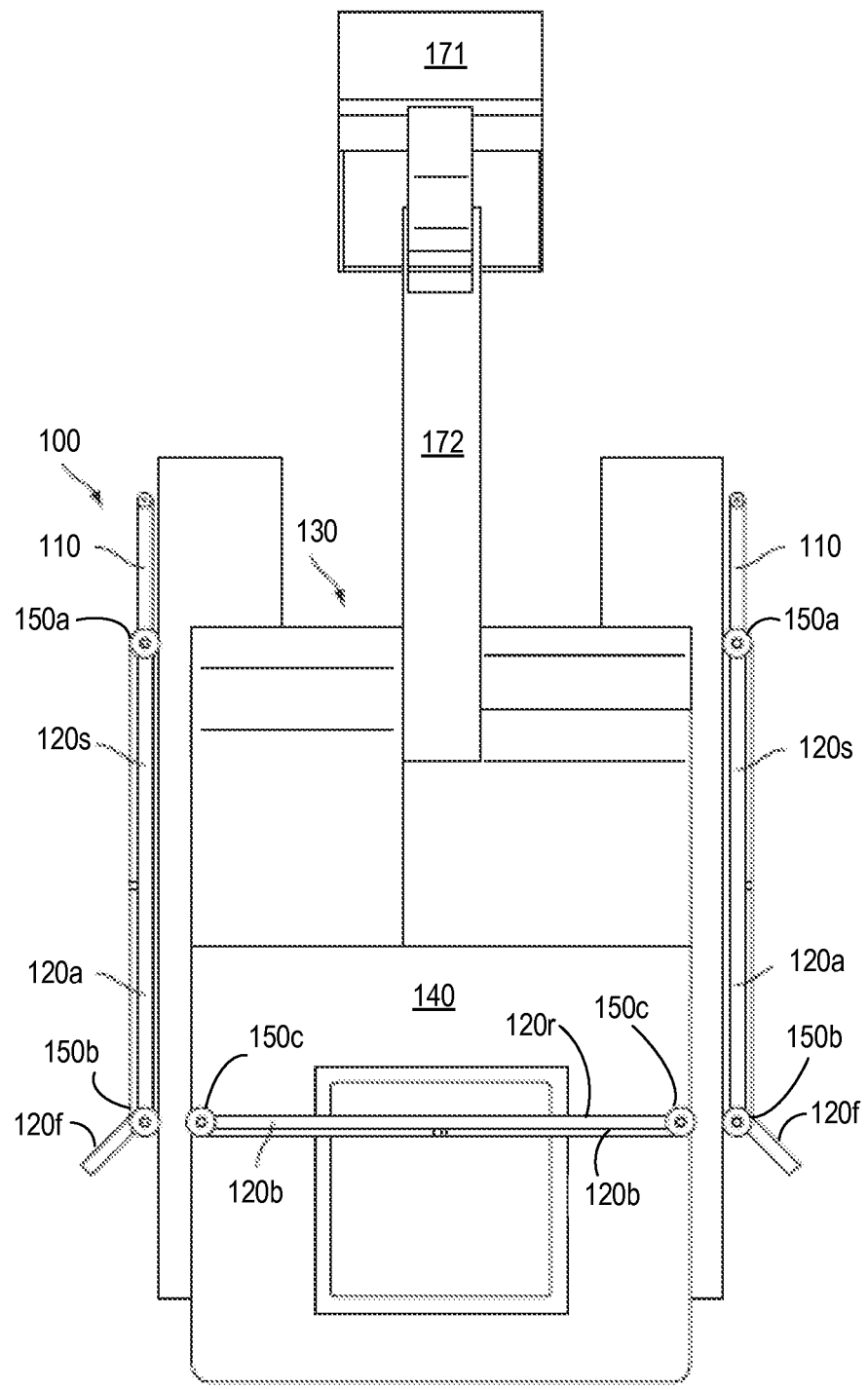
FIG. 4D shows the example safety apparatus of FIGS. 4A, 4B, and 4C in a fully retracted position.

FIGS. 4A-4D show an example safety apparatus in various stages of operation from full deployment (FIG. 4A) to full retraction (FIG. 4D). Although some embodiments of the safety apparatus may be deployable and retractable manually by hand, preferred embodiments include a drive system that is operable to deploy and retract the safety apparatus. Because deploying and retracting the safety apparatus 100 does not require workers to add or remove components from the safety apparatus 100, there is very little risk that workers will deploy the safety apparatus 100 incorrectly (and therefore compromise its effectiveness) or misplace parts or components when stowing the barrier after use (thereby comprising the ability to redeploy the barrier the next time it is required or desired). Further, the speed and ease with the safety apparatus 100 can be deployed and retracted substantially increases the likelihood that the safety apparatus 100 will actually be used on worksites over earlier approaches.

Additionally, in some embodiments, the safety apparatus 100 can be configured to deploy automatically when a particular component of the vehicle 130 is engaged for embodiments that include a drive system for deployment and retraction. For example, for cranes, excavators, and similar vehicles that have arms and rotating cabs, the safety apparatus 100 can be configured to deploy automatically when the mechanisms implement the cab rotation and/or arm manipulation function are activated. Alternatively, in some embodiments, such as crane, excavators, or similar vehicles, the vehicle may be configured to prevent operation of the crane or excavator arm (or prevent rotation of the cab) if the safety apparatus 100 is not deployed, thereby maximizing the efficacy of the safety apparatus 100. Such safety-enforcement mechanisms can be implemented with control circuitry similar to circuitry that, for example, prevents the vehicle from cranking unless the operator has activated the brake, and could be implemented with embodiments that are deployed manually or via a drive system.

The example embodiment shown in FIGS. 4A-4D includes a drive system, which includes hinges 150a-g, latches 155, and hydraulic cylinders 160a-c. The components shown in FIGS. 4A-D are for illustration purposes only and are not intended to be limiting. For example, other types of movement-facilitating components may be used instead of hinges. Similarly, other actuators, for example, pneumatic actuators or cylinders or electromechanical actuators such as electric motors may be used instead of hydraulic cylinders. In some embodiments, some portions or components of the safety apparatus may be deployed and retracted manually while other portions or components may be deployed and retracted via the drive system. For example, one or more latches or hinges may be operated manually while extension and retraction of support members and/or positioning of barrier components may be operated by the drive system. Similarly, in some embodiments, certain support elements and/or barrier components may be manually deployed and retracted while other support elements and/or barrier components may be deployed and retracted by the drive system.

FIG. 4A illustrates an example safety apparatus 100 in the fully deployed position. The safety apparatus 100 includes a plurality of support components 110a-d and a plurality of barrier components 120a, 120b, 120r, 120s, 120f, a plurality of hinges 150a-g, a plurality of latches 155, and a plurality of hydraulic cylinders 160a-c. In some embodiments, the safety apparatus 100 may be attached to the construction vehicle 130 as an "after-market" accessory. In other embodiments, the safety apparatus 100 may be integrated with the construction vehicle 130 at the time of manufacture. In either scenario, the safety barrier formed by the safety apparatus 100 surrounds at least a portion of the construction vehicle 130 when the safety apparatus 100 is fully deployed. Preferably, the safety barrier formed by the safety apparatus 100 extends just beyond the swing radius 140a of the rotatable cab 140 of the construction vehicle 130, for embodiments designed for vehicles that include rotating cabs.

The plurality of support components 110a-d are coupled to one or both (i) the cross-frame of the construction vehicle 130 or (ii) the track or wheel frame of the construction vehicle 130. As a result, once deployed, the safety barrier formed by the safety apparatus 100 remains in a fixed position while the rotatable cab 140 is free to rotate on top of the vehicle frame of the construction vehicle 130.

Each individual support component is also coupled (directly or indirectly) to one or more of the individual barrier components. For example, in the embodiment shown in FIG. 4A, support component 110a is coupled to barrier components 120f and 120s, support component 110b is coupled to barrier component 120s, support component 110c is coupled to barrier components 120s and 120a, and support component 110d is coupled to barrier component 120r (which is also coupled to barrier component 120b).

Individual hinges connect various portions of the safety apparatus 100 and allow for an angle of rotation to facilitate the deployment and retraction of the safety apparatus 100. In the embodiment shown in FIG. 4A, individual hinges allow for an angle of rotation (i) between adjacent barrier components, (ii) between a barrier component and a support component, and/or (iii) between portions of a support component. For example, hinge 150a (i) connects barrier component 120f, barrier component 120s, and support component 110a, (ii) allows barrier components 120f and 120s and support component 110a to move relative to one another. Similarly, hinge 150b (i) connects barrier component 120a, barrier component 120s, and support component 110c, and (ii) allows barrier components 120a and 120s and support component 110c to move relative to one another. Additionally, hinge 150c (i) connects barrier component 120r with barrier component 120b, and (ii) allows barrier components 120b and 120s to move relative to one another. Finally, hinges 150d-g (i) connect portions of support members a-d, respectively, and (ii) enable the respective portions of the support members a-d to rotate relative to one another.

Additionally, hinges or similar mechanisms (not shown) at the junction where each support member 110a-d is coupled to the vehicle frame and hinges (e.g., hinges 150a-b) at the junction where each support member 110a-d is coupled to one or more of the barrier components operate in concert with the hinges 150d-g to enable (i) a first portion of an individual support member to collapse toward the vehicle frame, (ii) a second portion of the individual support member to collapse toward a barrier component, and (iii) the first and second portions of the individual support member to collapse toward each other.

The latches 155 shown in FIG. 4A join barrier components 120a and 120b together when the safety apparatus 100 is fully deployed. The latches 155 also allow for the later separation of the barrier components 120a and 120b from one another so that the safety apparatus 100 can be retracted as described herein. Some embodiments may use fastening mechanisms other than latches to join barrier components together. Still further embodiments, however, may not require latches to join together barrier components at all, depending on the shape and arrangement of the support components and barrier components.

The drive mechanism also includes a plurality of hydraulic cylinders 160a-c. Each hydraulic cylinder is coupled to one or both of (i) the cross-frame of the construction vehicle 130 or (ii) the track or wheel frame of the construction vehicle 130. Each hydraulic cylinder is also coupled to at least one support component. In particular, hydraulic cylinder 160a is connected to support component 110a, hydraulic cylinder 160b is connected to support component 110b, and hydraulic cylinder 160c is connected to support component 110c.

As shown in FIG. 4A, the ram of each hydraulic cylinder is retracted within the barrel of the cylinder when the safety apparatus 100 is fully deployed. In particular, when the safety apparatus 100 is fully deployed, the ram 161a of hydraulic cylinder 160a is retracted within the barrel 162a, the ram 161b of hydraulic cylinder 160b is retracted within the barrel 162b, and the ram 161c of hydraulic cylinder 160c is retracted within the barrel 162c.

FIG. 4B shows the example safety apparatus of FIG. 4A in a preparatory stage of retraction.

Near the rear corner of the vehicle 130, latch 155 has been released to separate barrier component 120a from barrier component 120b. Barrier component 120a is rotated at hinge 150b in an outward direction away from the vehicle 130, and barrier component 120b is rotated at hinge 150c in an outward direction away from the vehicle. Near each front corner of the vehicle 130, barrier component 120f is rotated at hinge 150a in an outward direction away from the vehicle. The dotted line arrows indicate the direction of rotation by the barrier components. In some embodiments, hinge 155 may be released automatically (via a solenoid or similar actuation mechanism) or manually by hand. Similarly, the rotation of barrier components 120a, 120b, and 120f away from the vehicle 130 may be performed automatically (via one or more hydraulic or electronic actuation mechanisms (not shown)) or manually by hand.

FIG. 4C shows the example safety apparatus of FIGS. 4A and 4B in a further stage of retraction.

Near the rear corner of the vehicle 130, barrier component 120b is rotated further at hinge 150c toward barrier component 120r until barrier component 120b lies flat (or at least substantially flat) against barrier component 120r. In some embodiments, barrier component 120b may be latched (or otherwise fastened or secured) to barrier component 120r to hold barrier component 120b flat (or at least substantially flat) against barrier component 120r. Also, barrier component 120a is rotated at hinge 150b toward barrier component 120s until barrier component 120a lies flat (or at least substantially flat) against barrier component 120s. In some embodiments, barrier component 120a may be latched (or otherwise fastened or secured) to barrier component 120s to hold barrier component 120a flat (or at least substantially flat) against barrier component 120s. Near the front corner of the vehicle 130, barrier component 120f is rotated further at hinge 150a toward barrier component 120s until barrier component 120f lies flat (or at least substantially flaw) against barrier component 120s. In preferred embodiments, the layout and arrangement of the upper horizontal members 121a, lower horizontal members 121b, and plurality of connecting members 121c (FIG. 2) of the barrier components 120f, 120a, and 120s enable both barrier component 120a and barrier component 120f to lie flat (or at least substantially flat) against barrier component 120s.

Additionally, each hydraulic cylinder 160a-c of the apparatus extends its corresponding ram 161a-c to cause the safety apparatus 100 to retract inward toward the vehicle 130. In particular, hydraulic cylinder 160a extends its ram 161a against support member 110a, thereby causing the two halves of support member 110a to rotate inward toward one another at hinge 150d. Similarly, hydraulic cylinders 160b and 160c extend their rams 161b and 161c, respectively, against support members 110b and 110c, respectively, in a similar fashion to cause the corresponding halves of support members 110b and 110c to rotate inwardly at hinges 150e and 150f. Collapsing each of the support members 110a-c as shown in FIG. 4C causes the support members 110a-c to retract inward toward the vehicle 130, thereby pulling the previously collapsed barrier components closer to the side of the vehicle 130. A similar process is performed by one or more hydraulic cylinders (or similar drive mechanism) attached to support members 110d to retract barrier components 120r and 120b inward toward the rear of the vehicle.

FIG. 4D shows the example safety apparatus 100 of FIGS. 4A, 4B, and 4C in a fully retracted position. Once in the fully retracted position, the rams 161a-c (FIG. 4C) of the plurality of hydraulic cylinders 160a-c (FIG. 4C) are fully extended (or at least sufficiently extended), thereby causing the deployable safety apparatus 100 to be fully retracted (or at least sufficiently retracted) against the sides and rear of the construction vehicle 130. Latches (or other similar mechanisms) may be used to secure the deployable safety apparatus 100 or portions thereof (e.g., one or more of the barrier components) to one or both of the cross-frame or track or wheel frame of the construction vehicle 130. When fully retracted, the barrier components 120s, 120a, and 120f are held flat (or at least substantially flat) against the side of the vehicle 130, and the barrier components 120b and 120r are held flat (or at least substantially flat) against the rear of the vehicle 130 as shown in FIG. 4D, thereby facilitating easy transportation of the vehicle 130 between different locations on a worksite, between different worksites, and/or other locations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A deployable safety apparatus configured to attach to a vehicle frame, the safety apparatus comprising:
   a plurality of support components coupled to the vehicle frame, wherein individual support components are configured to (i) extend outwardly from the vehicle frame when the safety apparatus is deployed and (ii) retract inwardly toward the vehicle frame when the safety apparatus is not deployed;
   a plurality of barrier components, wherein individual barrier components are coupled to one or more corresponding support components of the plurality of support components and configured to (i) form a safety barrier surrounding at least a portion of the vehicle when the safety apparatus is deployed and (ii) remain in a retracted position when the safety apparatus is not deployed, wherein the safety apparatus is nearer the vehicle frame in the retracted position than when the safety apparatus is deployed; and
   wherein the individual barrier components comprise at least one of (i) a gate-like structure comprising an upper horizontal member, a lower horizontal member, and a plurality of connecting members coupled to the upper and lower horizontal members, (ii) a mesh structure, or (iii) a grate structure.

2. The deployable safety apparatus of claim 1, wherein the safety barrier surrounds at least a portion of a circumference defined by a swing radius of a rotatable cab coupled to the vehicle frame.

3. The deployable safety apparatus of claim 2, wherein the safety barrier surrounds a major arc of the circumference defined by a swing radius of a rotatable cab coupled to the vehicle frame.

4. The deployable safety apparatus of claim 1, wherein the safety apparatus is operable to be deployed and retracted manually by a person.

5. The deployable safety apparatus of claim 1, further comprising a drive system operable to deploy and retract the safety apparatus, wherein the drive system comprises one or more of (i) a plurality of hydraulic cylinders, (ii) a plurality of pneumatic cylinders, or (iii) one or more electric motors.

6. The deployable safety apparatus of claim 1, wherein an individual support component comprises a first portion attached to the vehicle frame via a first hinge and a second portion attached to a barrier component via a second hinge, wherein the first portion and second portion are coupled to each other via a third hinge, and wherein the first, second, and third hinges are operable to enable (i) the first portion of the individual support member to collapse toward the vehicle frame, (ii) the second portion of the individual support member to collapse toward the barrier component, and (iii) the first and second portions of the individual support member to collapse toward each other.

7. The deployable safety apparatus of claim 6, further comprising a hydraulic or pneumatic cylinder coupled to the vehicle frame and the first portion of the individual support member, wherein extending the cylinder causes (i) the first portion of the individual support member to collapse toward the vehicle frame, (ii) the second portion of the individual support member to collapse toward the barrier component, and (iii) the first and second portions of the individual support member to collapse toward each other; and wherein retracting the cylinder causes (i) the first portion of the individual support member to swing outward from the vehicle frame, (ii) the second portion of the individual support member to swing outwardly from the barrier component, and (iii) the first and second portions of the individual support member to swing outwardly from each other.

8. The deployable safety apparatus of claim 1, wherein at least one of the individual barrier components is sufficiently tall or expandable or extendable to form a wall-like structure extending upward from at least a portion of the vehicle frame when the safety apparatus is at least partially retracted against the vehicle frame.

9. The deployable safety apparatus of claim 1, wherein an individual barrier component comprises a latching mechanism configured to (i) latch to an adjacent barrier component when the safety apparatus is deployed and (ii) latch to the vehicle frame when the individual barrier component is retracted against the vehicle frame.

10. A construction vehicle comprising:
    a vehicle frame; and
    a deployable safety apparatus attached to the vehicle frame, wherein the safety apparatus comprises:
    a plurality of support components coupled to the vehicle frame, wherein individual support components are configured to (i) extend outwardly from the vehicle frame when the safety apparatus is deployed and (ii) retract inwardly toward the vehicle frame when the safety apparatus is not deployed;
    a plurality of barrier components, wherein individual barrier components are coupled to one or more corresponding support components of the plurality of support components and configured to (i) form a safety barrier surrounding at least a portion of the vehicle when the safety apparatus is deployed and (ii) remain in a retracted position when the safety apparatus is not deployed, wherein the safety apparatus is nearer the vehicle frame in the retracted position than when the safety apparatus is deployed; and
    wherein the individual barrier components comprise at least one of (i) a gate-like structure comprising an upper horizontal member, a lower horizontal member, and a plurality of connecting members coupled to the upper and lower horizontal members, (ii) a mesh structure, or (iii) a grate structure.

11. The construction vehicle of claim 10, further comprising:
    a rotatable cab coupled to the vehicle frame; and
    wherein the safety barrier surrounds at least a portion of a circumference defined by a swing radius of the rotatable cab.

12. The construction vehicle of claim 10, further comprising:
    a rotatable cab coupled to the vehicle frame, and wherein the safety barrier surrounds a major arc of the circumference defined by a swing radius of the rotatable cab.

13. The construction vehicle of claim 10, wherein an individual support component comprises a first portion attached to the vehicle frame via a first hinge and a second portion attached to a barrier component via a second hinge, wherein the first portion and second portion are coupled to each other via a third hinge, and wherein the first, second, and third hinges are operable to enable (i) the first portion of the individual support component to collapse toward the vehicle frame, (ii) the second portion of the individual support component to collapse toward the barrier component, and (iii) the first and second portions of the individual support component to collapse toward each other.

14. The construction vehicle of claim 13, wherein the drive system comprises one or more of (i) a plurality of hydraulic cylinders, (ii) a plurality of pneumatic cylinders, or (iii) one or more electric motors.

15. The construction vehicle of claim 10, further comprising:
 a drive system operable to deploy and retract the safety apparatus;
 circuitry configured to activate the drive system to deploy and retract the safety apparatus; and
 protection circuitry configured to monitor whether the safety apparatus is in a deployed or a retracted position, and prevent the construction vehicle from performing one or more functions when the safety apparatus is in the retracted position.

16. The construction vehicle of claim 15, wherein the drive mechanism comprises one of a hydraulic or pneumatic cylinder coupled to the vehicle frame and the first portion of the individual support component, wherein extending the cylinder causes (i) the first portion of the individual support component to collapse toward the vehicle frame, (ii) the second portion of the individual support component to collapse toward the barrier component, and (iii) the first and second portions of the individual support component to collapse toward each other; and wherein retracting the cylinder causes (i) the first portion of the individual support component to swing outward from the vehicle frame, (ii) the second portion of the individual support component to swing outwardly from the barrier component, and (iii) the first and second portions of the individual support component to swing outwardly from each other.

17. The construction vehicle of claim 10, wherein at least one of the individual barrier components is sufficiently tall or expandable or extendable to form a fall-prevention barrier extending upward from at least a portion of the vehicle frame when the safety apparatus is at least partially retracted against the vehicle frame.

18. The construction vehicle of claim 10, wherein an individual barrier component comprises a latching mechanism configured to (i) latch to an adjacent barrier component when the safety apparatus is deployed and (ii) latch to the vehicle frame when the individual barrier component is retracted against the vehicle frame.

* * * * *